United States Patent
Kim et al.

(10) Patent No.: US 11,795,348 B2
(45) Date of Patent: Oct. 24, 2023

(54) ADHESIVE COMPOSITION AND PROTECTIVE FILM PRODUCED USING SAME

(71) Applicant: LG Chem, Ltd., Seoul (KR)

(72) Inventors: Yeo Ju Kim, Daejeon (KR); Han Soo Kim, Daejeon (KR); Kee Young Kim, Daejeon (KR); Yoon Jung Kim, Daejeon (KR); Sang Hyun Hong, Daejeon (KR)

(73) Assignee: LG Chem, Ltd.

( * ) Notice: Subject to any disclaimer, the term of this patent is extended or adjusted under 35 U.S.C. 154(b) by 131 days.

(21) Appl. No.: 16/764,164

(22) PCT Filed: Dec. 21, 2018

(86) PCT No.: PCT/KR2018/016520
§ 371 (c)(1),
(2) Date: May 14, 2020

(87) PCT Pub. No.: WO2019/132455
PCT Pub. Date: Jul. 4, 2019

(65) Prior Publication Data
US 2020/0377763 A1    Dec. 3, 2020

(30) Foreign Application Priority Data
Dec. 27, 2017 (KR) .................. 10-2017-0181622

(51) Int. Cl.
| | | |
|---|---|---|
| *C09J 7/20* | (2018.01) | |
| *C09J 4/06* | (2006.01) | |
| *C08F 220/18* | (2006.01) | |
| *C08F 220/06* | (2006.01) | |
| *C08F 220/20* | (2006.01) | |

(52) U.S. Cl.
CPC ............... *C09J 4/06* (2013.01); *C08F 220/06* (2013.01); *C08F 220/1804* (2020.02); *C08F 220/20* (2013.01); *C09J 7/20* (2018.01); *C09J 2301/122* (2020.08); *Y10T 428/28* (2015.01); *Y10T 428/2891* (2015.01)

(58) Field of Classification Search
None
See application file for complete search history.

(56) References Cited

U.S. PATENT DOCUMENTS

| | | | | |
|---|---|---|---|---|
| 4,234,662 A * | 11/1980 | Pastor | ..................... | C09J 7/10 428/500 |
| 6,488,983 B2 | 12/2002 | Slone | | |
| 11,466,105 B2 * | 10/2022 | Lee | ..................... | C09J 7/35 |
| 2002/0165316 A1 | 11/2002 | Slone | | |
| 2004/0192831 A1 | 9/2004 | Chen et al. | | |
| 2006/0036027 A1 * | 2/2006 | Chen | ..................... | C09J 133/04 524/800 |
| 2010/0137524 A1 * | 6/2010 | Grittner | ..................... | C08J 3/247 525/330.5 |
| 2014/0307364 A1 | 10/2014 | Konishi et al. | | |
| 2015/0010753 A1 * | 1/2015 | Ha | ..................... | C09J 133/04 428/354 |
| 2016/0222260 A1 | 8/2016 | Kim et al. | | |
| 2017/0081567 A1 | 3/2017 | Ha et al. | | |
| 2017/0362348 A1 | 12/2017 | Gryska et al. | | |
| 2020/0392267 A1 * | 12/2020 | Lee | ..................... | C09J 7/35 |
| 2022/0154042 A1 * | 5/2022 | Lee | ..................... | C08K 5/544 |

FOREIGN PATENT DOCUMENTS

| | | |
|---|---|---|
| CN | 1791651 A | 6/2006 |
| CN | 103205223 A | 7/2013 |
| CN | 103918111 A | 7/2014 |
| CN | 105315924 A | 2/2016 |
| JP | H06344488 A | 12/1994 |
| JP | 2001303007 A | 10/2001 |
| JP | 2015003959 A | 1/2015 |
| KR | 20130050879 A | 5/2013 |
| KR | 20130133721 A | 12/2013 |
| KR | 20150015707 A | 2/2015 |
| KR | 20150022382 A | 3/2015 |
| KR | 20150110928 A | 10/2015 |
| KR | 20150120573 A | 10/2015 |
| KR | 101666260 B1 | 10/2016 |
| KR | 20160142403 A | 12/2016 |
| KR | 20170062369 A | 6/2017 |
| KR | 20170092501 A | 8/2017 |
| KR | 20170099923 A | 9/2017 |

OTHER PUBLICATIONS

Keum-hyung Lee et al., "An Adhesive Composition and Manufacturing Method Thereof", English translation of KR1020150015707 A, Feb. 11, 2015 (Year: 2015).*
Extended European Search Report including Written Opinion for Application No. 18896165.0 dated Feb. 8, 2021, 7 pages.
Chinese Search Report for Application No. 201880075389.2, dated Mar. 26, 2021, 2 pages.
International Search Report for Application No. PCT/KR2018/016520, dated Mar. 29, 2019, pp. 1-2.

* cited by examiner

*Primary Examiner* — Anish P Desai
(74) *Attorney, Agent, or Firm* — Lerner David LLP

(57) ABSTRACT

The present invention relates to an adhesive composition and a protective film including an adhesive layer formed by using the same, wherein the adhesive composition includes an acrylic copolymer formed by polymerizing a monomer mixture, the monomer mixture including a monomer represented by [Formula 1], a (meth)acrylic monomer including a carboxy group, a (meth)acrylic monomer including a cross-linkable functional group, and an alkyl(meth)acrylate-based monomer, wherein the acrylic copolymer has a polymerization conversion rate of 99 wt % or higher.

6 Claims, No Drawings

ADHESIVE COMPOSITION AND PROTECTIVE FILM PRODUCED USING SAME

CROSS-REFERENCE TO RELATED APPLICATIONS

The present application is a national phase entry under 35 U.S.C. § 371 of International Application No. PCT/KR2018/016520, filed Dec. 21, 2018, which claims priority to Korean Patent Application No. 10-2017-0181622, filed on Dec. 27, 2017, the disclosures of which are incorporated herein by reference in their entirety.

TECHNICAL FIELD

The present invention relates to an adhesive composition and a protective film produced using the same, and more specifically, to an adhesive composition having excellent coating properties, not much change in adhesion over time, and excellent contamination resistance under high temperature and/or high humidity conditions, and a protective film produced using the same.

BACKGROUND ART

A protective film is used to prevent damages to the surface of a product which are caused by physical impact that may occur in the process of transporting, storing, and/or assembling the product, and typically has a structure in which an adhesive layer is formed on either side or both sides of a plastic substrate film, such as polyethylene terephthalate.

Such a protective film is removed by being peeled off when the transporting, storing, and/or assembly are completed. When the adhesion of the protective film is greater than necessary, the surface of a product may be damaged or stained during the process of removing the protective film. Particularly, during high-speed peeling, the peeling may not be obtained properly, causing the reduction in workability.

In addition, when the cohesive force of the protective film is low, the adhesion to a substrate film is poor, so that an adhesive is transferred to the product surface, causing a defect such as stains on the product surface. Also, moisture and the like penetrates between the protective film and the protective surface, causing contamination, such as leaving stains, and the like. Particularly, when exposed to high temperature and/or high humidity conditions, the occurrence of contamination tends to become more intense. In addition, adhesives for protective film which have been typically used have problems in that physical properties of an adhesive layer is changed over time, thereby deteriorating the stability of the adhesive layer.

Accordingly, there has been a demand for the development of an adhesive for protective film, the adhesive having excellent stability over time and being capable of minimizing contamination on the surface of a product even in high temperature and high humidity environments.

PRIOR ART DOCUMENT (Patent Document 1) Korean Patent Laid-Open Publication No. 10-2013-0133721 (Dec. 9, 2013)

DISCLOSURE OF THE INVENTION

Technical Problem

An aspect of the present invention provides an adhesive composition having excellent stability over time and contamination resistance even in high temperature and high humidity environments, and a protective film produced using the same.

Technical Solution

According to an aspect of the present invention, there is provided an adhesive composition including an acrylic copolymer formed by polymerizing a monomer mixture, the monomer mixture including a monomer represented by [Formula 1], a (meth)acrylic monomer including a carboxy group, a (meth)acrylic monomer including a cross-linkable functional group, and an alkyl(meth)acrylate-based monomer, wherein the acrylic copolymer has a polymerization conversion rate of 99% or higher.

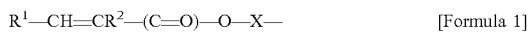

$$R^1\text{---}CH\text{=}CR^2\text{---}(C\text{=}O)\text{---}O\text{---}X\text{---} \quad \text{[Formula 1]}$$

In Formula 1, $R^1$ is hydrogen, a C1-C6 alkyl group, or a C2-C6 alkenyl group; $R^2$ is hydrogen or a C1-C10 alkyl group; X is a single bond, a C1-C10 alkylene group, a C2-C10 alkenylene group, ether, ester, or a combination thereof; and Y is a vinyl group, an allyl group, or a C3-C10 cycloalkenyl group.

According to another aspect of the present invention, there is provided a protective film including an adhesive layer formed by using the adhesive composition according to the present invention.

Advantageous Effects

An adhesive composition according to the present invention includes an acrylic copolymer having a branched polymer structure, and thus, has low viscosity properties compared to a typical adhesive composition using an acrylic resin of a linear polymer structure, so that excellent coating properties may be implemented. In addition, the acryl-based copolymer of a branched polymer structure has more terminal groups of a polymer chain compared to the acrylic resin of a linear structure having the same weight average molecular weight, thereby having excellent wetting properties for an adherent. Accordingly, when the acrylic copolymer of a branched polymer is used, stable peel force may be implemented, and there is less change in an adhesive layer over time.

In addition, the adhesive composition according to the present invention leaves few residues on an adherent after removing a protective film even under high temperature/high humidity conditions, thereby having excellent contamination resistance properties.

BEST MODE FOR CARRYING OUT THE INVENTION

Hereinafter, the present invention will be described in more detail.

In the present specification, when terms such as 'include', 'has', and 'is composed of' are used, other parts may be added unless '~only' is used. Elements of a singular form may include elements plural forms unless the context clearly indicates otherwise.

In interpreting elements, it is to be construed as including an error range even if there is no separate explicit recitation.

In the present specification, ⌈(meth)acrylic⌋ is a generic term for acrylic and methacrylic. For example, (meth) acrylate includes methacrylate and acrylate, and (meth) acrylic acid includes acrylic acid and methacrylic acid.

In the present specification, the term ⌜X to Y⌝ indicating a range refers to ⌜equal to or more than X to equal to or less than Y⌝.

In the present specification, ⌜branched polymer structure⌝ refers to a polymer structure having two or more long chains grown in different directions.

Hereinafter, an adhesive composition according to the present invention will be described in detail.

Adhesive Composition (1) Acrylic Copolymer

An acrylic adhesive composition according to the present invention includes an acrylic copolymer formed by polymerizing a monomer mixture, the monomer mixture including a monomer represented by [Formula 1] below, a (meth)acrylic monomer including a carboxy group, a (meth)acrylic monomer including a cross-linkable functional group, and an alkyl(meth)acrylate-based monomer, wherein the acrylic copolymer has a polymerization conversion rate of 99% or higher.

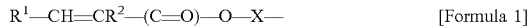    [Formula 1]

In Formula 1, $R^1$ is hydrogen, a C1-C6 alkyl group, or a C2-C6 alkenyl group; $R^2$ is hydrogen or a C1-C10 alkyl group; X is a single bond, a C1-C10 alkylene group, a C2-C10 alkenylene group, ether, ester, or a combination thereof; and Y is a vinyl group, an allyl group, or a C3-C10 cycloalkenyl group.

The monomer represented by [Formula 1] is for forming an acrylic copolymer of a branched polymer structure. Typically, as an acrylic copolymer used for an acrylic adhesive, an acrylic copolymer having a linear structure in which monomers are polymerized in one long chain form has been mainly used. However, when an acrylic copolymer having the above linear structure is used, as weight average molecular weight is increased, viscosity is also increased, so that coating properties are deteriorated.

According to the studies of the present inventors, when an acrylic copolymer is formed by adding the monomer represented by [Formula 1] above as in the present invention, a copolymer having a branched polymer structure, not a liner type one, is formed. Specifically, the monomer of the above [Formula 1] has two or more ethylene groups, in which radicals may be formed respectively in free radical polymerization and chains may grow in different directions. As a result, a branched polymer having two or more chains of different growth direction is formed. The acrylic copolymer having the above branched polymer structure has more terminal groups of a polymer chain compared to a linear acrylic polymer having the same weight average molecular weight, thereby having excellent wetting properties and low viscosity properties to implement excellent coating properties.

Specific examples of the monomer represented by [Formula 1] include one or more selected from the group consisting of allyl methacrylate, allyl acrylate, methallyl methacrylate, methallyl acrylate, 3-butenyl acrylate, but-3-enyl-2-methylprop-2-enoate, 2-allyloxyethyl acrylate, 2-allyloxyethyl methacrylate, 3-allyloxypropyl methacrylate, 3-allyloxypropyl acrylate, 2-allyloxyethoxyethyl methacrylate, 2-allyloxyethoxyethyl acrylate, cyclohex-2-enyl acrylate, cyclohex-2-en-1-yl 2-methylprop-2-enoate, and 3-vinylcyclohex-2-enyl acrylate, but are not limited thereto. The monomer represented by [Formula 1] may be included in an amount of 0.01-1 part by weight, preferably 0.05-0.8 parts by weight, more preferably 0.1-0.6 parts by weight based on 100 parts by weight of the monomer mixture. When the content of the monomer represented by [Formula 1] is less than 0.01 parts by weight, it is difficult to prepare a polymer having a branched polymer structure, and when greater than 1 part by weight, it is difficult to control the increase in molecular weight and viscosity.

Next, the (meth)acrylic monomer including a carboxy group is for improving adhesion and contamination resistance by increasing cohesion of the adhesive composition. The (meth)acrylic monomer including a carboxy group may be, for example, (meth)acrylic acid, 2-(meth)acryloyloxyacetic acid, 3-(meth)acryloyloxypropyl acid, 4-(meth)acryloyloxybutyric acid, acrylic acid dimer, itaconic acid, maleic acid, maleic anhydride, and the like, but is not limited thereto.

Meanwhile, the (meth)acrylic monomer including a carboxy group may be included in an amount of 1 part by weight or less, preferably 0.01-1 part by weight, more preferably 0.1-1 part by weight based on 100 parts by weight of the monomer mixture. When the content of the (meth)acrylic monomer including a carboxy group is greater than 1 part by weight, peel force is increased due to the increase in cohesion of an adhesive composition, so that the adhesive composition is not suitable for the protective film of the present invention.

Next, the (meth)acrylic monomer including a cross-linkable functional group is for improving adhesion to a substrate and an adherent, and may be, for example, a hydroxy group-containing monomer, or a nitrogen-containing monomer, but is not limited thereto. Specific examples of the hydroxy group-containing monomer may be 2-hydroxyethyl (meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate, or 2-hydroxypropylene glycol(meth)acrylate, and the like. Examples of the nitrogen-containing monomer may be (meth)acrylamide, N-vinylpyrrolidone, or N-vinylcaprolactam, and the like.

The (meth)acrylic monomer including a cross-linkable functional group may be included in an amount of 0.1-15 parts by weight, preferably 1-10 parts by weight, more preferably 1-5 parts by weight based on 100 parts by weight of the monomer mixture. When the content of the (meth)acrylic monomer including a cross-linkable functional group satisfies the above range, adhesion to the substrate and the adherent is excellent.

Next, it is preferable that the alkyl(meth)acrylate-based monomer includes an alkyl group having 2-14 carbon atoms. When an alkyl group included in the alkyl(meth)acrylate-based monomer is in high concentration, the cohesion of an adhesive is deteriorated and it may be difficult to control glass transition temperature (Tg) or adhesion properties. Examples of the alkyl(meth)acrylate-based monomer include ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth)acrylate, isononyl (meth)acrylate, lauryl(meth)acrylate, and tetradecyl(meth)acrylate. In the present invention, any one thereof or a mixture of two or more thereof may be used.

The alkyl(meth)acrylate-based monomer may be included in an amount of 84.98-99.88 parts by weight, preferably 89.85-98.85 parts by weight, more preferably 94.8-98.8 parts by weight based on 100 parts by weight of the monomer mixture.

According to an embodiment, the (meth)acrylic copolymer may be formed by polymerizing a monomer mixture, the monomer mixture including 0.01-1 part by weight of the monomer represented by [Formula 1]; 0.01-1 part by weight of the (meth)acrylic monomer including a carboxy group; 84.98-99.88 parts by weight of the alkyl(meth)acrylate-based monomer; and 0.1-15 parts by weight of the (meth) acrylic monomer including a cross-linkable functional group.

The acrylic copolymer according to the present invention may be prepared by mixing each of the monomers described above to prepare a monomer mixture, and then performing a polymerization reaction. The polymerization method is not particularly limited. Various polymerization methods known in the art, such as solution polymerization, photo polymerization, bulk polymerization, suspension polymerization, or emulsion polymerization may be used. During the polymerization, a polymerization initiator, a molecular weight control agent and the like may be additionally added. The time of injection of each component is not particularly limited. That is, the components may be injected all at once, or may be injected at different times in installments.

In the present invention, acrylic resin may be prepared by, particularly, solution polymerization. It is preferable that the solution polymerization is performed by adding an initiator, a molecular weight control agent and the like at a polymerization temperature of 50-140° C. in a state in which each monomer is uniformly mixed. Examples of the initiator which can be used in the process may include conventional initiators, for example, an azo-based initiator such as azobisisobutyronitrile and azobiscyclohexane carbonitrile and the like; and/or peroxide such as benzoyl peroxide and acetyl peroxide. Any one thereof or a mixture of two or more thereof may be used, but the initiator is not limited thereto. In addition, as the molecular weight control agent, mercaptans such as dodecyl mercaptan and n-dodecyl mercaptan, terpenes such as dipentene and t-terpene, halogenated hydrocarbon of carbon tetrachloride, or pentaerythritol tetrakis 3-mercapto propionate, and the like may be used. However, the molecular weight control agent is not limited thereto.

The acrylic copolymer of the present invention prepared as described above may have a weight average molecular weight of 300,000-1,000,000 g/mol, preferably 300,000-700,000 g/mol. When the weight average molecular weight of the acrylic copolymer is less than 300,000 g/mol, due to the deterioration of curing efficiency, the cohesion of the adhesive is insufficient, thereby deteriorating peeling properties. When greater than 1,000,000 g/mol, viscosity is increased, thereby deteriorating coating properties.

In addition, it is preferable that the acrylic copolymer has a polymerization conversion rate of 99% or higher. When an acrylic copolymer having a polymerization conversion rate of less than 99% is used, an additional curing reaction may proceed to increase peel force and residues of an adhesive layer remains on an adherent after removing the adhesive layer, thereby causing contamination.

In addition, the acrylic copolymer of the present invention has a branched polymer structure. The acrylic copolymer having a branched polymer structure has low viscosity properties compared with an acrylic copolymer of a linear structure having the same weight average molecular weight, and thus, is capable of implementing excellent coating properties.

(2) Curing Agent

The curing agent is for forming a cross-linking structure to express adhesive properties through a chemical reaction, and the kind thereof is not particularly limited. Various curing agents used in the art may be used. For example, one or more selected from the group consisting of an isocyanate-based compound, an epoxy-based compound, an aziridine-based compound, and a metal chelate-based compound may be used.

As the isocyanate-based compound, any typical isocyanate-based compound known in the art may be used. For example, toluene diisocyanate, 2,4-trilene diisocyanate, 2,6-trilene diisocyanate, hydrogenated trilene diisocyanate, isoform diisocyanate, 1,3-xylene diisocyanate, 1,4-xylene diisocyanate, diphenylmethane-4,4-diisocyanate, 1,3-bisisocyanatomethyl cyclohexane, tetramethyl xylylene diisocyanate, 1,5-naphthalene diisocyanate, hexamethylene diisocyanate, 2,2,4-trimethylhexamethylene diisocyanate, 2,4,4-trimethylhexamethylene diisocyanate, trimethylolpropane-modified toluene diisocyanate, trimethylolpropane-modified tolylene diisocyanate, trilene diisocyanate adduct of trimethylolpropane, xylenediosocyanate adduct of trimethylolpropane, toriphenylmethane triisocyanate, methylene bistriisocyanate, a polyol (trimethylol propane) thereof, or a mixture thereof, and the like may be used.

As the epoxy-based compound, for example, ethylene glycol diglycidyl ether, triglycidyl ether, trimethylolpropane triglycidyl ether, N, N, N', N'-tetraglycidylethylenediamine, glycerin diglycidyl ether, or a mixture thereof may be used.

As the aziridine-based compound, for example, N, N'-toluene-2,4-bis (1-aziridine carboxamide), N, N'-diphenylmethane-4,4'-bis (1-aziridine carboxamide), triethylene melamine, bis-isoprothaloyl-1-2-methyl aziridine), tri-1-aziridinylphosphine oxide, or a mixture thereof may be used.

The metal chelate-based compound may be, for example, a compound in which a polyvalent metal such as aluminum, iron, zinc, tin, titanium, antimony, magnesium and/or vanadium is coordinated to acetyl acetone or ethyl acetoacetate, and the like, but is not limited thereto.

It is preferable that the curing agent is included in an amount of 0.01-10 parts by weight, preferably 0.1-5 parts by weight, more preferably 0.1-3 parts by weight based on 100 parts by weight of the acrylic copolymer. When the content of the curing agent is out of the above range, it is difficult to secure stable peeling force reproducible, and coating properties may be deteriorated due to the increase in viscosity.

(3) Other Components

In order to control physical properties, the adhesive composition of the present invention may further include other components, such as a solvent, a silane coupling agent, a cross-linking catalyst, an adhesive imparting resin and an additive, in addition to the components described above.

The adhesive composition of the present invention may further include a solvent for controlling viscosity. At this time, the solvent may be, for example, ethyl acetate, n-pentane, isopentane, neopentane, n-hexane, n-octane, n-heptane, methyl ethyl ketone, acetone, toluene, or a combination thereof, but is not limited thereto.

In addition, the adhesive composition of the present invention may further include a silane coupling agent.

The coupling agent is for improving adhesion and adhesion stability between an adhesive and a substrate. Examples of the coupling agent that may be used in the present invention include γ-glycidoxypropyl triethoxy silane, γ-glycidoxypropyl trimethoxy silane, γ-glycidoxypropyl methylethoxy silane, γ-glycidoxypropyl triethoxy silane, 3-mercaptopropyl trimethoxy silane, vinyl trimethoxysilane, vinyl triethoxy silane, γ-methacryloxypropyl trimethoxy silane, γ-methacryloxypropyl triethoxy silane, γ-aminopropyl trimethoxy silane, γ-aminopropyl triethoxy silane, 3-isocyanatopropyl triethoxy silane, γ-acetoacetylpropyl trimethoxysilane, γ-acetoacetyl propyl triethoxy silane, β-cyanoacetyl trimethoxy silane, β-cyanoacetyl triethoxy silane, and acetoxyaceto trimethoxy silane, and any one thereof or a mixture of two or more thereof may be used. In the present invention, it is preferable that a silane-based coupling agent having an acetoacetate group or a β-cyanoacetyl group is used. However, the coupling agent is not limited thereto.

In the composition of the present invention, the silane-based coupling agent may be included in an amount of 0.01 parts by weight to 5 parts by weight, preferably 0.01 parts by weight to 1 part by weight based on 100 parts by weight of the acrylic copolymer. When the content of the coupling agent is less than 0.01 parts by weight, the effect of increasing adhesion is insignificant. When greater than 5 parts by weight, durability may be deteriorated.

In terms of controlling adhesion performance, the adhesive composition of the present invention may further include 1 part by weight to 100 parts by weight of an adhesive imparting resin based on 100 parts by weight of the acrylic copolymer. The kind of the adhesive imparting resin is not particularly limited. For example, any one of or a mixture of two or more of (hydrogenated) hydrocarbon-based resin, (hydrogenated) rosin resin, (hydrogenated) rosin ester resin, (hydrogenated) terpene resin, (hydrogenated) terpene phenol resin, polymerized rosin resin, or polymerized rosin ester resin, and the like, may be used. When the content of the adhesive imparting resin is less than 1 part by weight, the effect of adding the adhesive imparting resin may be insignificant. When greater than 100 parts by weight, the effect of improving compatibility and/or cohesion may be deteriorated.

The adhesive composition of the present invention may further include one or more additives selected from the group consisting of an epoxy resin, a curing agent, an ultraviolet stabilizer, an anti-oxidation agent, a coloring agent, a reinforcing agent, a filler, an anti-foaming agent, a surfactant, and a plasticizer, to the extent that the effect of the invention is not affected.

The adhesive composition according to the present invention including the components described above has low viscosity properties compared with a typical adhesive composition, and thus, is capable of implementing excellent coating properties.

In addition, the adhesive composition according to the present invention is excellent in heat resistance and there is not much change in the physical properties of an adhesive layer under high temperature conditions.

Furthermore, the adhesive composition according to the present invention has excellent adhesion to various materials such as glass and metal, and is excellent in transparency is excellent, and thus, may be applied to various fields. For example, the according to the present invention according to the present invention may be usefully used as a protective film for vehicles or as a protective film for optical devices.

Protective Film

Next, a protective film according to the present invention will be described. The protective film of the present invention includes an adhesive layer formed using the adhesive composition according to the present invention. More specifically, the protective film according to the present invention may include a substrate film and an adhesive layer formed on either side or both sides of the substrate film and formed by curing the adhesive composition according to the present invention.

As the substrate film, various films which are used as a substrate of a protective film in the art may be used. For example, a synthetic resin film of such as polyethylene, polyethylene terephthalate, polypropylene, polyester, polyamide, polyimide, polycarbonate, ethylene acetic acid vinyl copolymer, Ethylene ethyl acrylate copolymer, ethylene polypropylene copolymer, and polyvinyl chloride may be used. However, the substrate film is not particularly limited thereto.

The substrate film may be formed of a single-layered body or a multi-layered body, and may have a thickness of 5-500 μm.

In addition, in order to improve adhesion to an adhesive layer, a surface treatment, for example, a corona discharge treatment, a plasma treatment, a blast treatment, a chemical etching treatment, a primer treatment, and the like may be performed on the surface of the substrate film.

Meanwhile, the adhesive layer may be formed by applying the adhesive composition according to the present invention on the substrate film, following by drying. In general, the applying may be performed with a knife coater, a roll coater, a calendar coater, a comb coater, and the like. Alternatively, depending on the applying thickness and viscosity of an application liquid, the applying may be performed with a gravure coater, a rod coater, and the like.

Meanwhile, the drying may be performed at 60° C. to 150° C., preferably 70° C. to 120° C. for 1 minute to 10 minutes.

In addition, when necessary, an aging processing may be further performed to complete a cross-linking reaction after the drying processing is terminated. The aging processing may be performed, for example, for 1 day to 7 days in the temperature range of 25° C. to 90° C.

The above-described protective film of the present invention has excellent adhesion at room temperature and has not much change in physical properties of an adhesive layer, and thus has excellent stability over time. Specifically, the protective film has an adhesion change rate of 30% or less, preferably 20% or less, more preferably 15% of less, the rate defined by Equation (1) below.

$$\text{Adhesion change rate (\%)} = \{(A_0 - A_1)/A_0\} \times 100 \qquad \text{Equation (1):}$$

In Equation (1), $A_0$ is adhesion measured one day after attaching the protective film on a glass substrate, and $A_1$ is adhesion measured 30 days after attaching the protective film on a glass substrate. At this time, the adhesion was measured as a force required to completely separate the protective film from the glass substrate by pulling the protective film at a peeling rate of 300 mm/min and a peeling angle of 180 degrees, using TA equipment (Texture Analyzer, manufactured by Stable Micro Systems, UK).

In addition, the protective film according to the present invention has excellent contamination resistance even when exposed to high temperature/high humidity environment, so that it is possible to minimize the occurrence of defective products due to contamination.

MODE FOR CARRYING OUT THE INVENTION

Hereinafter, examples of the present invention will be described in detail so that those skilled in the art can easily carry out the present invention. The present invention may, however, be embodied in many different forms and is not limited to the examples set forth herein.

Preparation Example 1: Preparation of Acrylic Copolymer (A)

To a 3 L reactor in which nitrogen gas is refluxed, and a cooling device is installed to facilitate temperature control, a monomer mixture including 96.7 parts by weight of butyl acrylate (BA), 2.0 parts by weight of hydroxybutyl acrylate (HBA), 1 part by weight of acrylic acid (AA), 0.18 parts by weight of allyl methacrylate (AMA) were injected. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.23 parts by weight of n-dodecylmercaptan (n-DDM) as a molecular weight control agent, 0.1 parts by weight of azobis (2,4-dimethylvaleronitrile) (V-65, Manufacturer: Wako) as a polymerization initiator, and 0.12 parts by weight of allyl methacrylate were further injected thereto, and then subjected to a reaction for 10 hours to prepare an acrylic copolymer (A). At this time, the allyl methacrylate was injected 3 hours after the reaction started. The molecular weight control agent was injected in five divided portions in the 5 hours after the reaction started, and the polymerization initiator was injected in 10 divided portions in the 7 hours after the reaction started while checking the degree of heat generation. The polymerization conversion rate of the acrylic copolymer (A) was 99.1%.

Preparation Example 2: Preparation of Acrylic Copolymer (B)

To a 3 L reactor in which nitrogen gas is refluxed, and a cooling device is installed to facilitate temperature control, a monomer mixture including 96.5 parts by weight of butyl acrylate (BA), 2.0 parts by weight of hydroxybutyl acrylate (HBA), 1 part by weight of acrylic acid (AA), 0.3 parts by weight of allyl methacrylate (AMA) were injected. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.23 parts by weight of n-dodecylmercaptan (n-DDM) as a molecular weight control agent, 0.1 parts by weight of azobis (2,4-dimethylvaleronitrile) (V-65, Manufacturer: Wako) as a polymerization initiator, and 0.2 parts by weight of allyl methacrylate were further injected thereto, and then subjected to a reaction for 10 hours to prepare an acrylic copolymer (B). At this time, the allyl methacrylate was injected 3 hours after the reaction started. The molecular weight control agent was injected in five divided portions in the 5 hours after the reaction started, and the polymerization initiator was injected in 10 divided portions in the 7 hours after the reaction started while checking the degree of heat generation. The polymerization conversion rate of the acrylic copolymer (B) was 99.5%.

Preparation Example 3: Preparation of Acrylic Copolymer (C)

To a 3 L reactor in which nitrogen gas is refluxed, and a cooling device is installed to facilitate temperature control, a monomer mixture including 97.7 parts by weight of butyl acrylate (BA), 2.0 parts by weight of hydroxybutyl acrylate (HBA), and 0.18 parts by weight of allyl methacrylate (AMA) were injected. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.23 parts by weight of n-dodecylmercaptan (n-DDM) as a molecular weight control agent, 0.1 parts by weight of azobis (2,4-dimethylvaleronitrile) (V-65, Manufacturer: Wako) as a polymerization initiator, and 0.12 parts by weight of allyl methacrylate were further injected thereto, and then subjected to a reaction for 10 hours to prepare an acrylic copolymer (C). At this time, the allyl methacrylate was injected 3 hours after the reaction started. The molecular weight control agent was injected in five divided portions in the 5 hours after the reaction started, and the polymerization initiator was injected in 10 divided portions in the 7 hours after the reaction started while checking the degree of heat generation. The polymerization conversion rate of the acrylic copolymer (C) was 99.5%.

Preparation Example 4: Preparation of Acrylic Copolymer (D)

An acrylic copolymer (D) was prepared in the same manner as in Preparation Example 1 except that the polymerization was performed for 8 hours. The polymerization conversion rate of the acrylic copolymer (D) was 97.3%.

Preparation Example 5: Preparation of Acrylic Copolymer (E)

To a 3 L reactor in which nitrogen gas is refluxed, and a cooling device is installed to facilitate temperature control, a monomer mixture including 98 parts by weight of butyl acrylate (BA) and 2.0 parts by weight of hydroxybutyl acrylate (HBA) were injected. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.15 parts by weight of n-dodecylmercaptan (n-DDM) as a molecular weight control agent and 0.1 parts by weight of azobis (2,4-dimethylvaleronitrile) (V-65, Manufacturer: Wako) as a polymerization initiator were further injected thereto, and then subjected to a reaction for 10 hours to prepare an acrylic copolymer (E). At this time, the molecular weight control agent was injected in five divided portions in the 5 hours after the reaction started, and the polymerization initiator was injected in 10 divided portions in the 7 hours after the reaction started while checking the degree of heat generation. The polymerization conversion rate of the acrylic copolymer (E) was 99.2%.

Preparation Example 6: Preparation of Acrylic Copolymer (F)

To a 3 L reactor in which nitrogen gas is refluxed, and a cooling device is installed to facilitate temperature control, a monomer mixture including 95 parts by weight of butyl acrylate (BA), 2.0 parts by weight of hydroxybutyl acrylate (HBA), 1 part by weight of acrylic acid (AA), 1.2 parts by weight of allyl methacrylate (AMA) were injected. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.23 parts by weight of n-dodecylmercaptan (n-DDM) as a molecular weight control agent, 0.1 parts by weight of azobis (2,4-dimethylvaleronitrile) (V-65, Manufacturer: Wako) as a polymerization initiator, and 0.8 parts by weight of allyl methacrylate were further injected thereto, and then subjected to a reaction for 8 hours to prepare an acrylic copolymer (F). At this time, the allyl methacrylate was injected 3 hours after the reaction started. The molecular weight control agent was injected in five divided portions in the 5 hours after the reaction started, and the polymerization initiator was injected in 10 divided portions in the 7 hours after the reaction started while checking the degree of heat generation. The polymerization conversion rate of the acrylic copolymer (F) was 97.3%.

Preparation Example 7: Preparation of Acrylic Copolymer (G)

To a 3 L reactor in which nitrogen gas is refluxed, and a cooling device is installed to facilitate temperature control, a monomer mixture including 95.7 parts by weight of butyl acrylate (BA), 2.0 parts by weight of hydroxybutyl acrylate (HBA), 2.0 part by weight of acrylic acid (AA), 0.18 parts by weight of allyl methacrylate (AMA) were injected. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.23 parts by weight of n-dodecylmercaptan (n-DDM) as a molecular weight control agent, 0.1 parts by weight of azobis (2,4-dimethylvaleronitrile) (V-65, Manufacturer: Wako) as a polymerization initiator, and 0.12 parts by weight of allyl methacrylate were further injected thereto, and then subjected to a reaction for 8 hours to prepare an acrylic copolymer (G). At this time, the allyl methacrylate was injected 3 hours after the reaction started. The molecular weight control agent was injected in five divided portions in the 5 hours after the reaction started, and the polymerization initiator was injected in 10 divided portions in the 7 hours after the reaction started while checking the degree of heat generation. The polymerization conversion rate of the acrylic copolymer (G) was 97.5%.

The weight average molecular weight and the polymer structure of the acrylic copolymer prepared in each of Preparation Examples 1 to 7 were measured in the following manner and the results are shown in Table 1 below.

evaluated. At this time, the content of the (meth)acrylic monomer including a carboxy group and the content of the (meth)acrylic monomer including a cross-linkable functional group in the monomer mixture were set to be the same as the content of the content of the (meth)acrylic monomer including a carboxy group and the content of the (meth) acrylic monomer including a cross-linkable functional group in the evaluation target copolymer, respectively. Thereafter, the monomer mixture was polymerized to prepare an acrylic copolymer (hereinafter 'standard copolymer') having an equivalent level of a weight average molecular weight (Error range ±5%) to the weight average molecular weight of the evaluation target copolymer.

Thereafter, to each of the standard copolymer and the evaluation target copolymer, an ethyl acetate solvent was added such that the solid concentration was controlled to be 40 wt %, and viscosity was measured. When the viscosity of the evaluation target copolymer which was measured as described above was lower than the viscosity of the standard copolymer by 30% or more, the evaluation target copolymer was evaluated as having a branched polymer structure, and in other cases, the evaluation target copolymer was evaluated as having a linear polymer structure.

TABLE 1

| | | Preparation Examples | | | | | | |
|---|---|---|---|---|---|---|---|---|
| Classification | | 1 | 2 | 3 | 4 | 5 | 6 | 7 |
| Samples | | A | B | C | D | E | F | G |
| Composition (parts by weight) | BA | 96.7 | 96.5 | 97.7 | 96.7 | 98.0 | 95.0 | 95.7 |
| | HBA | 2.0 | 2.0 | 2.0 | 2.0 | 2.0 | 2.0 | 2.0 |
| | AA | 1.0 | 1.0 | — | 1.0 | — | 1.0 | 2.0 |
| | AMA | 0.3 | 0.5 | 0.3 | 0.3 | — | 2.0 | 0.3 |
| | n-DDM | 0.23 | 0.23 | 0.23 | 0.23 | 0.15 | 0.23 | 0.23 |
| Reaction time (hr) | | 10 | 10 | 10 | 8 | 10 | 8 | 8 |
| Polymerization conversion rate (%) | | 99.1 | 99.5 | 99.5 | 97.3 | 99.2 | 97.3 | 97.5 |
| Weight average molecular weight (g/mol) | | 590,000 | 590,000 | 580,000 | 560,000 | 560,000 | 580,000 | 580,000 |
| Polymer structure | | Branch type | Branch type | Branch type | Branch type | Linear | Branch type | Branch type |

(1) Weight Average Molecular Weight:

The weight average molecular weight was measured under the following conditions using GPC. In making a calibration curve, the measurement results were converted using standard polystyrene of the Agilent system.

<Measurement Conditions>

Measurement device: Agilent GPC (Agulent 1200 series, USA)

Column: Two PL Mixed B connections
Column temperature: 40° C.
Eluent: tetrahydrofuran
Flow rate: 1.0 m/min
Density: ~1 mg/mL (100 μL injection)

(2) Polymer Structure

The polymer structure was evaluated in the following manner.

First, a monomer mixture was prepared by mixing the same alkyl(meth)acrylate-based monomer, (meth)acrylic monomer including a carboxy group, and (meth)acrylic monomer including a cross-linkable functional group as those used in an acrylic copolymer (hereinafter 'evaluation target copolymer'), the polymer structure of which is to be Example 1

100 parts by weight of the acrylic copolymer A prepared in Preparation Example 1 and 1 part by weight of a curing agent (Coronate L, manufactured by Nippon Polyurethane) were mixed to prepare an adhesive composition (coating liquid).

The adhesive composition was applied on a polyethylene terephthalate (PET) film, dried at 90° C. for 2 minutes, and then aged for 2 days at 50° C. to prepare a protective film.

Example 2

An adhesive composition and a protective film were prepared in the same manner as in Example 1 except that the acrylic copolymer B prepared in Preparation Example 2 was used instead of the acrylic copolymer A prepared in Preparation Example 1.

Comparative Example 1

An adhesive composition and a protective film were prepared in the same manner as in Example 1 except that the acrylic copolymer C prepared in Preparation Example 3 was used instead of the acrylic copolymer A prepared in Preparation Example 1.

Comparative Example 2

An adhesive composition and a protective film were prepared in the same manner as in Example 1 except that the acrylic copolymer D prepared in Preparation Example 4 was used instead of the acrylic copolymer A prepared in Preparation Example 1.

Comparative Example 3

An adhesive composition and a protective film were prepared in the same manner as in Example 1 except that the acrylic copolymer E prepared in Preparation Example 5 was used instead of the acrylic copolymer A prepared in Preparation Example 1.

Comparative Example 4

An adhesive composition and a protective film were prepared in the same manner as in Example 1 except that the acrylic copolymer F prepared in Preparation Example 6 was used instead of the acrylic copolymer A prepared in Preparation Example 1.

Comparative Example 5

An adhesive composition and a protective film were prepared in the same manner as in Example 1 except that the acrylic copolymer G prepared in Preparation Example 7 was used instead of the acrylic copolymer A prepared in Preparation Example 1.

The physical properties of the adhesive composition and the protective film prepared in each of Examples 1 to 2 and Comparative Examples 1 to 5 were measured, and the measurement results are shown in Table 2 below.

Method for Measuring Physical Properties

1. Coating Viscosity (Unit: cP)

The coating viscosity of the adhesive compositions was evaluated according to the following procedure using a measurement device (Brookfield digital viscometer (RV DV2T)).

220 mL of the adhesive composition was placed into a 250 mL PE bottle, and then the cover was closed and tightly sealed with Parafilm or the like to prevent a solvent from being volatilized. Thereafter, the adhesive composition was left under the constant temperature/humidity (23° C., 50% relative humidity) conditions to remove air bubbles. Then, the cover and the seal were removed. Thereafter, a spindle was placed in the adhesive composition at an angle such that air bubbles were not generated, and the spindle was connected to a viscometer and then adjusted such that the liquid surface of the adhesive composition was fit the grooves of the spindle. Thereafter, viscosity was measured under an rpm condition in which the torque is 20%(±1%).

2. Coating Properties

The adhesive composition prepared in each of Examples and Comparative Examples was coated on the polyethylene terephthalate film, and the state of the coating layer was observed with the naked eye and evaluated according to the following criteria.

<Coating Properties Evaluation Criteria>

OK: Air bubbles, stripes, and the like on the coating layer are not visually confirmed.

NG: Air bubbles and/or stripes on the coating layer are visually confirmed.

3. Adhesion at Room Temperature (Unit: Gf/25 mm) and Adhesion Change Rate (Unit: %)

The protective film prepared in each of Examples and Comparative Examples were respectively attached to an alkali-free glass substrate, and then stored under the constant temperature/humidity conditions (23° C., 50% relative humidity) for 1 day and 30 days, respectively. Thereafter, a force required to completely separate the protective film from the substrate by pulling the protective film at a peeling rate of 300 mm/min and a peeling angle of 180 degrees was measured using TA equipment (Texture Analyzer, manufactured by Stable Micro Systems, UK), and the force was evaluated as adhesion at room temperature (unit: gf/25 mm).

Adhesion at room temperature $A_0$ one day after the storage and adhesion at room temperature $A_1$ 30 days after the storage, which were measured as described above, were applied to Equation (1) to calculate an adhesion change rate.

$$\text{Adhesion change rate } (\%) = \{(A_0 - A_1)/A_0\} \times 100 \quad \text{Equation (1):}$$

4. Evaluation of Contamination Resistance

The protective film prepared in each of Examples and Comparative Examples was attached to an alkali-free glass to prepare a specimen for measurement, and the measurement specimen was left for 2 hours at a temperature of 120° C. Then, the protective film was removed from the glass and whether there were residues or stains on the glass was observed with the naked eye to evaluate contamination resistance under high temperature conditions.

Also, the measurement specimen was left for 72 hours under the conditions of a temperature of 60° C. and a relative humidity of 90% R.H. Then, the protective film was removed from the glass and whether there were residues or stains left on the glass was observed with the naked eye to evaluate contamination resistance under high temperature/humidity conditions.

After the protective film was removed, when there was no residues or stains left on the glass, it was marked OK, and when there were residues or stains left on the glass, it was marked NG.

TABLE 2

| | | Examples | | Comparative Examples | | | | |
|---|---|---|---|---|---|---|---|---|
| | | 1 | 2 | 1 | 2 | 3 | 4 | 5 |
| Composition (parts by weight) | Acrylic copolymer | A | B | C | D | E | F | G |
| | | 100 | 100 | 100 | 100 | 100 | 100 | 100 |
| | Curing agent | 1.0 | 1.0 | 1.0 | 1.0 | 1.0 | 1.0 | 1.0 |
| Coating viscosity (cP) | | 430 | 380 | 400 | 390 | 9400 | 7600 | 400 |
| Coating properties | | OK | OK | OK | OK | NG | NG | OK |

TABLE 2-continued

| | | Examples | | Comparative Examples | | | | |
|---|---|---|---|---|---|---|---|---|
| | | 1 | 2 | 1 | 2 | 3 | 4 | 5 |
| Adhesion at room temperature (gf/25 mm) | After 1 day | 13 | 15 | 9 | 14 | Not measurable | | 15 |
| | After 30 days | 11 | 13 | 5 | 12 | Not measurable | | 14 |
| | Adhesion change rate | 15 | 13 | 44 | 14 | | | 15 |
| Contamination resistance | High temperature | OK | OK | OK | NG | | | NG |
| | High temperature/ high humidity | OK | OK | NG | NG | | | NG |

From Table 2 above, it can be confirmed that the adhesive composition of each of Examples 1 to 2 has low coating viscosity, thereby having excellent coating properties, and that the protective film prepared using the same respectively has excellent adhesion at room temperature and a low rate of change in the adhesive layer over time, thereby having excellent contamination resistance under high temperature/humidity conditions.

On the other hand, the protective film of Comparative Example 1 using the acrylic copolymer C prepared without using a carboxy-containing monomer had lower adhesion at room temperature, greater change in the acrylic copolymer over time, and lower contamination resistance under high temperature/humidity conditions than the protective film of each of Examples 1 to 2.

In addition, the protective film of Comparative Example 2 using the acrylic copolymer D having a polymerization conversion rate of less than 99% had adhesion similar to that of the protective film of each of Examples 1 to 2, but had lower contamination resistance.

Also, in the cases of the adhesive composition of Comparative Example 3 using the acrylic copolymer E prepared without using the monomer of [Formula 1] and the monomer including a carboxy-containing monomer and the adhesive composition of Comparative Example 4 using the acrylic copolymer F having a polymerization conversion rate of less than 99% and using the monomer of [Formula 1] in an excessive amount, the coating viscosity of each of the adhesive composition was too high, so that the coating properties were decreased, and it was impossible to measure physical properties since an adhesion layer was not properly formed.

Meanwhile, the adhesive composition of Comparative Example 5 using the acrylic copolymer G having a polymerization conversion rate of less than 99% and including the (meth)acrylic monomer containing a carboxy group in an excessive amount had good coating properties and adhesion, but the contamination resistance thereof was deteriorated.

The invention claimed is:

1. An adhesive composition comprising an acrylic copolymer formed by polymerizing a monomer mixture including monomers, and a curing agent, the monomers consisting of:

a monomer represented by [Formula 1] below;

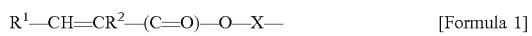

R¹—CH=CR²—(C=O)—O—X—     [Formula 1]

in Formula 1, R¹ is hydrogen, a C1-C6 alkyl group, or a C1-C6 alkenyl group; R² is hydrogen or a C1-C10 alkyl group; X is a single bond, a C1-C10 alkylene group, a C2-C10 alkenylene group, ether, ester, or a combination thereof; and Y is a vinyl group, an allyl group, or a C3-C10 cycloalkenyl group, a (meth)acrylic monomer including a carboxy group;

a (meth)acrylic monomer including a cross-linkable functional group; and an alkyl(meth)acrylate-based monomer; wherein the acrylic copolymer has a polymerization conversion rate of 99% or higher, wherein the adhesive composition comprises based on 100 parts by weight of the monomer mixture, 0.01-1 part by weight of the monomer represented by [Formula 1];

0.01-1 part by weight of the (meth)acrylic monomer including a carboxy group;

84.98-99.88 parts by weight of the alkyl(meth)acrylate-based monomer; and 0.1-15 parts by weight of the (meth)acrylic monomer including a cross-linkable functional group, wherein the curing agent is included in an amount of 0.01-10 parts by weight based on 100 parts by weight of the acrylic copolymer.

2. The adhesive composition of claim 1, wherein the acrylic copolymer is a polymer having a branched polymer structure.

3. The adhesive composition of claim 1, wherein the acrylic copolymer has a weight average molecular weight of 300,000-1,000,000 g/mol.

4. The adhesive composition of claim 1, wherein the monomer represented by [Formula 1] above is one or more selected from the group consisting of allyl methacrylate, allyl acrylate, methallyl methacrylate, methallyl acrylate, 3-butenyl acrylate, but-3-enyl-2-methylprop-2-enoate, 2-allyloxyethyl acrylate, 2-allyloxyethyl methacrylate, 3-allyloxypropyl methacrylate, 3-allyloxypropyl acrylate, 2-allyloxyethoxyethyl methacrylate, 2-allyloxyethoxyethyl acrylate, cyclohex-2-enyl acrylate, cyclohex-2-en-1-yl 2-methylprop-2-enoate, and 3-vinylcyclohex-2-enyl acrylate.

5. A protective film comprising an adhesive layer formed by using the adhesive composition of claim 1, and a substrate film on which the adhesive layer is formed.

6. The protective film of claim 5, wherein the protective film has an adhesion change rate of 30% or less, which is defined by Equation (1) below:

Adhesion change rate (%)={($A_0-A_1$)/$A_0$}×100     Equation (1)

in Equation (1), $A_0$ is adhesion measured one day after attaching the protective film on a glass substrate, and $A_1$ is adhesion measured 30 days after attaching the protective film on a glass substrate.

\* \* \* \* \*